(12) United States Patent
Navali et al.

(10) Patent No.: US 7,969,945 B2
(45) Date of Patent: Jun. 28, 2011

(54) SYSTEMS AND METHODS FOR MOBILITY MANAGEMENT ON WIRELESS NETWORKS

(75) Inventors: Mruthyunjaya Navali, Westford, MA (US); Kuntal Chowdhury, Plano, TX (US)

(73) Assignee: Starent Networks LLC, Wilmington, DE (US)

( * ) Notice: Subject to any disclaimer, the term of this patent is extended or adjusted under 35 U.S.C. 154(b) by 425 days.

(21) Appl. No.: 11/652,410

(22) Filed: Jan. 11, 2007

(65) Prior Publication Data

US 2007/0189255 A1   Aug. 16, 2007

Related U.S. Application Data

(60) Provisional application No. 60/758,343, filed on Jan. 11, 2006.

(51) Int. Cl.
   *H04W 4/00* (2009.01)
(52) U.S. Cl. ........ 370/331; 455/411; 455/439; 455/436; 455/437; 455/438
(58) Field of Classification Search .................. 370/331, 370/242; 455/432, 411, 436–439
   See application file for complete search history.

(56) References Cited

U.S. PATENT DOCUMENTS

| | | | |
|---|---|---|---|
| 6,708,031 B2 | 3/2004 | Purnadi et al. | |
| 6,768,726 B2 | 7/2004 | Dorenbosch et al. | |
| 6,859,448 B1 | 2/2005 | Roy | |
| 2003/0087629 A1* | 5/2003 | Juitt et al. | 455/411 |
| 2004/0013116 A1 | 1/2004 | Greis et al. | |
| 2004/0185777 A1* | 9/2004 | Bryson | 455/41.1 |
| 2005/0102529 A1 | 5/2005 | Buddhikot et al. | |
| 2005/0117546 A1* | 6/2005 | Lioy et al. | 370/332 |
| 2005/0201297 A1* | 9/2005 | Peikari | 370/242 |
| 2006/0128362 A1* | 6/2006 | Bae et al. | 455/411 |
| 2006/0245373 A1* | 11/2006 | Bajic | 370/254 |
| 2006/0245393 A1* | 11/2006 | Bajic | 370/331 |
| 2006/0245404 A1* | 11/2006 | Bajic | 370/338 |
| 2006/0268765 A1* | 11/2006 | Bajic et al. | 370/328 |
| 2006/0268834 A1* | 11/2006 | Bajic | 370/352 |
| 2007/0002833 A1* | 1/2007 | Bajic | 370/352 |
| 2007/0072605 A1* | 3/2007 | Poczo | 455/432.2 |
| 2007/0160072 A1* | 7/2007 | Thalanany et al. | 370/401 |

(Continued)

OTHER PUBLICATIONS

International Search Report and Written Opinion issued for International Patent Application No. PCT/US2007/000671.

(Continued)

*Primary Examiner* — Jinsong Hu
*Assistant Examiner* — Nathan Taylor
(74) *Attorney, Agent, or Firm* — Wilmer Cutler Pickering Hale and Dorr LLP (57) ABSTRACT

Systems and methods to manage network access (e.g., IPv4 and IPv6) and layer 3 mobility are provided. This can allow mobility management to be moved from a mobile node's stack to the access gateway, simplifying the stack and providing fast handoffs. The mobility management at an access gateway further allows a mobile node to keep its dynamically assigned IP address for the duration of a call session and through handoffs. The placement of access gateways in a domain of trust allows security information to be passed between access gateways in a handoff so that the security associations do not need to be re-authenticated with the mobile node. One or more of the above mobility management features can be used to provide a fast and seamless handoff for a mobile node.

23 Claims, 7 Drawing Sheets

U.S. PATENT DOCUMENTS

2007/0268889 A1* 11/2007 Heutschi et al. ............ 370/352
2009/0131053 A1* 5/2009 Sachs et al. ................. 455/436

OTHER PUBLICATIONS

"Context Transfer, Handoff Candidate Discovery, and Dormant Mode Alerting (seamoby)," http://www.ietf.org/proceedings/54/217.htm, Apr. 8, 2002.

Kempf, J. "Problem Description: Reasons for Performing Context Transfers Between Nodes in an IP Access Network, Context and Micro-mobility Routing Working Group," Internet Draft, draft-ietf-seamoby-context-transfer-problem-stat-04.txt, Nov. 2001.

Kempf, J. "Problem Description: Reasons for Performing Context Transfers Between Nodes in an IP Access Network," Network Working Group, Sep. 2002.

Loughney, J. et al., "Context Transfer Protocol," Seamoby WG, Internet Draft, Category: Experimental <draft-ietf-seamoby-ctp-11.txt>, Aug. 2004.

Syed, et al., "General Requirements for Context Transfer," Internet Engineering Task Force, Internet Draft, draft-ietf-seamoby-ct-reqs-03.txt, Jan. 2002.

* cited by examiner

SYSTEMS AND METHODS FOR MOBILITY MANAGEMENT ON WIRELESS NETWORKS

CROSS-REFERENCE TO RELATED APPLICATIONS

This application claims benefit of U.S. Provisional Patent Application No. 60/758,343, filed Jan. 11, 2006, which is hereby incorporated by reference herein in its entirety.

TECHNICAL FIELD OF THE DISCLOSURE

Systems and methods for providing mobility management for mobile nodes on a wireless network are presented. More particularly, network nodes handle the mobility management for mobile nodes accessing the wireless network using an Internet Protocol, speeding up the handoff process and reducing data loss.

BACKGROUND OF THE DISCLOSURE

The idea of managing mobility of a wireless device or mobile node on a network has been around for some time. Allowing a mobile node such as a cell phone or a personal digital assistant (PDA) to roam on the wireless network requires managing various equipment. When a mobile node passes from one radio tower to another radio tower, the mobile node can pass into areas of the network controlled by different equipment. At some point, to prevent the call from being disconnected or dropped, information is forwarded to the equipment that will be handling the call next so that the call can continue without interruption.

With the advent of Internet Protocol (IP), networks began sending data in packets and using an IP address to route the data to its final destination. In time, wireless networks started to become data capable and would assign an IP address to a mobile node for the purpose of sending data to the mobile node. Generally, interconnection between devices is standardized to a certain degree based on the International Organization for Standardization (ISO)'s definition of a model for Open Systems Interconnection (OSI). OSI is used to define modes of interconnection between different components in networking systems and uses a seven layer model to do so.

Among the seven layers, Layer 3(L3) is the network layer which is concerned with the delivery of packets of data. This layer defines the address structure of the network and how packets should be routed between end systems. IP and Internet Packet Exchange (IPX) are examples of network layer protocols. Layer 2 (L2) is the data link layer which also defines a lower level addressing structure for use between end systems as well as lower level framing and checksums which are used to transmit data onto the physical medium. Ethernet, Token Ring, and Frame Relay are examples of data link layer or L2 protocols. Typically, L2 switching is implemented alongside L3 routing for local area networks to facilitate communication between devices in a common IP subnet. However, in a wireless network where a mobile node can roam among base stations, handoffs can pose a problem in terms of security and continuity of data flow.

Mobile IP was introduced to allow a mobile node to keep the same IP address regardless of where the mobile node travels. When the mobile node is at home, it is on the home network, or the network with which it is typically associated. The router connected to the home network is the home agent. When the mobile node is away from the home network, it associates with a foreign network and communicates through a foreign agent. In the event that packets are sent to a mobile node, the packets first travel to the home network. If the mobile node is not residing in the home network the packets are forwarded to the foreign agent with which the mobile node is registered; and from the foreign agent, the packets are delivered to the mobile node.

Currently, the mobile node is involved in much of the mobility management required for handoffs in a Mobile IP implementation. With Mobile IP (MIP), typically a MIP stack is used to keep a permanent IP address with the mobile node, to assist in handoffs, and to provide a certain level of security between handoffs. The present invention moves much of the MIP stack functionality from the mobile node and handles the handoffs in a different manner.

SUMMARY OF THE DISCLOSURE

Systems and methods to manage network access (e.g., IPv4 and IPv6) and anchor layer 3 mobility at an access gateway are provided. This can allow mobility management to be shifted from a mobile node to the access gateway. In some embodiments, shifting mobility management to an access gateway further maintains a dynamically assigned IP address for the duration of a call session and through handoffs for a mobile node. The access gateways and other networking equipment can be placed in a domain of trust to allow security information to be passed between access gateways in a handoff. This provides a handoff where security associations do not need to be re-authenticated between an access gateway and the mobile node. Further, a tunnel for bi-casting can be setup between access gateways during a handoff to reduce latency and lost data packets. The access gateway can store and generate key information for a mobile node to reduce the mobile node's processing loads.

Certain embodiments feature a communication system with mobility management including a first access gateway that receives an address request from a mobile node, the first access gateway sending an address response with a dynamically assigned IP address to the mobile node, a second access gateway receiving information from the first access gateway regarding the mobile node in a handoff and the second access gateway maintaining the same dynamically assigned IP address for the mobile node.

Some embodiments feature a method of mobility management which include receiving an address request at a first access gateway, sending an address response from the access gateway including a dynamically assigned IP address, sending information from the first access gateway to a second access gateway in a handoff, and maintaining the same IP address through the handoff by anchoring layer 3 mobility at the second access gateway.

Certain embodiments feature a communication system with mobility management including a first mechanism that receives an address request from a mobile node, the first mechanism sending an address response with a dynamically assigned IP address to the mobile node, a second mechanism receiving information from the first mechanism regarding the mobile node in a handoff and the second mechanism maintaining the same dynamically assigned IP address for the mobile node.

DETAILED DESCRIPTION OF CERTAIN EMBODIMENTS

The present invention relates to methods and systems for network nodes to provide mobility management for mobile nodes accessing a wireless network using an Internet Protocol (IP). Generally, a mobile node provides the necessary mobility management which can result in more complex processing to take place on the mobile node, possibly dropped packets in handoffs, and latency in obtaining security keys and other network information.

Figure 1:
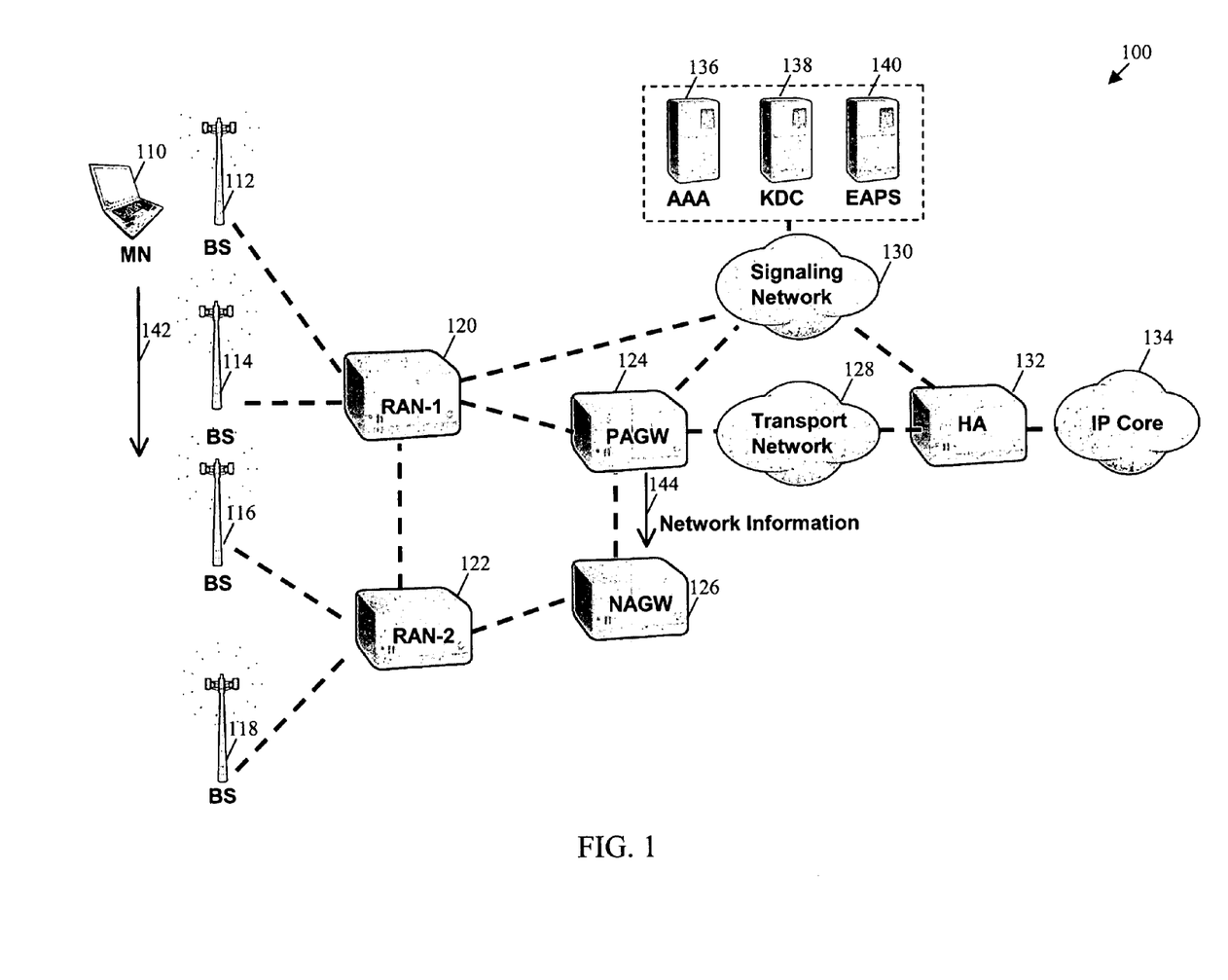
FIG. 1 is a schematic representation of portions of a wireless data network used to deliver data to a Mobile Node in accordance with certain embodiments of the invention.

FIG. 1 is a schematic representation of portions of a wireless data network 100 used to deliver data to a Mobile Node 110 in accordance with certain embodiments of the present invention. Wireless data network 100 includes Mobile Node 110, Base Station (BS) 112-118, Radio Access Network (RAN) equipment 120-122, Previous Access Gateway (PAGW) 124, New Access Gateway (NAGW) 126, Transport Network 128, Signaling Network 130, Home Agent (HA) 132, IP Core 134, Authentication, Authorization, and Accounting (AAA) Server 136, Key Distribution Center (KDC) 138, and Extensible Authentication Protocol (EAP) Server 140. As may be appreciated by one practiced in the field, routers, servers and other pieces of networking and communication equipment may also be included in wireless data network 100 depending on the embodiment.

In wireless data network 100, Mobile Node 110 communicates with the network wirelessly through a Base Station such as BS 112, which transmits data to and receives data from Mobile Node 110 through the radio waves. BS 112 receives data from RAN 120 which is in turn coupled to Signaling Network 130 and through access gateway Transport Network 128. As shown, Transport Network 128 and Signaling Network 130 are coupled to Home Agent 132 and Home Agent 132 is coupled to IP Core 134. Signaling Network 130 can be used to forward data relating to such functions as authentication, authorization, accounting, and security for transmissions involving Mobile Node 110. In some embodiments, both Signaling Network 130 and Transport Network 128 are implemented on the same network, such as the Internet or any other packet switched network.

Devices such as AAA 136, KDC 138, and EAPS 140 are responsible for the authentication, authorization, accounting, key distribution, and other switching functionalities for wireless data network 100. Transport Network 128 provides data transmission to a Mobile Node that is not located in its respective Home Network (not shown) by forwarding data from Home Agent 132 to an Access Gateway for further transmission to Mobile Node 110. Home Agent 132 also receives data from IP Core 134 which can include the Internet, content servers, email servers, connections to other Mobile Nodes, and any other suitable source or destination for data. In certain embodiments, the Access Gateway, such as PAGW 124, can be implemented on a Packet Data Serving Node (PDSN), as a stand alone entity, or on any other suitable piece of networking equipment.

The Access Gateways are shown in FIG. 1 as PAGW 124 and NAGW 126 and provide an anchor for the Layer 3 networking activity. In certain embodiments, the Access Gateway assists with mobility management functions such as assigning an IP address to a mobile node and also moves Layer 3 networking activity from Mobile Node 110 to PAGW 124 and/or NAGW 126. Typically, a Mobile Node uses a stack, which can be implemented with a processor and memory to provide mobility management functionality. The stack can be used to manage an IP address, to assist in handoffs, and to provide security. The stack can specifically be a Mobile IP stack or a stack including one or more networking and communication protocols such as IP, User Datagram Protocol (UDP), and/or Transmission Control Protocol (TCP). In some embodiments, the Access Gateway is utilized to provide mobility management functionality which would typically be implemented in a Mobile Node stack.

When Mobile Node 110 is roaming (shown by arrow 142) and changing Base Stations, Mobile Node 110 is switched among equipment in wireless data network 100 as well. As shown, when Mobile Node 110 is roaming from BS 112 to BS 114, Mobile Node 110 is still provided service by Radio Access Network equipment 120. However, when Mobile Node 110 moves on to BS 116 or BS 118, Mobile Node 110 then communicates through Radio Access Network equipment 122. RAN-1 120 and RAN-2 122 includes of Radio Network Controllers (RNC), Radio Access Bearers (RAB), and other suitable equipment as is known in the field. The Radio Access Network equipment generally converts data into radio wave spectrum suitable for transmission by a Base Station and converts received radio wave spectrum information into data for forwarding to equipment such as PAGW 124 and/or NAGW 126.

In a handoff procedure, such as when Mobile Node 110 moves from BS 114 to BS 116, the handoff also includes switching from RAN-1 120 to RAN-2 122 and PAGW 124 to NAGW 126. In some embodiments, network information 144 is passed from PAGW 124 to NAGW 126 to maintain session continuity and reduce latency that might otherwise occur from Mobile Node 110 having to re-connect, re-associate, and re-authorize with wireless data network 100 to receive data transmissions. A trusted access gateway allows passing of security information so re-association and re-authorization can be avoided. Handoff and access procedures with an Access Gateway controlling a portion of mobility management functionality is described further below.

Figure 2:
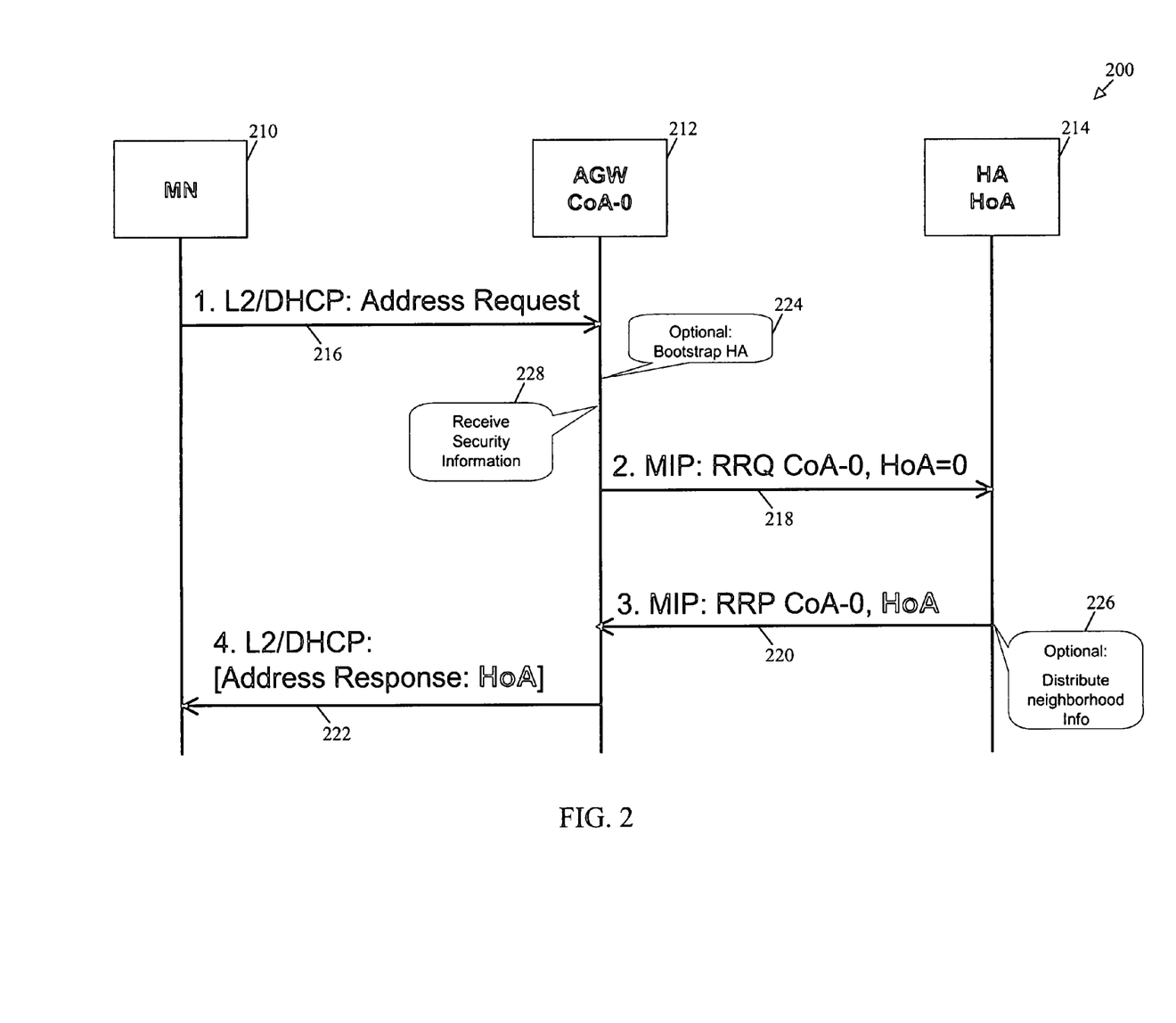
FIG. 2 is a graphical representation of a communication system and procedure for network access with Mobile Internet Protocol (MIP) version 4 in accordance with certain embodiments of the invention.

FIG. 2 is a graphical representation of a communication system and procedure 200 for network access with Mobile Internet Protocol (MIP) version 4 in accordance with certain embodiments of the present invention. The system components of communication system 200 include Mobile Node (MN) 210, Access Gateway (AGW) 212, and Home Agent (HA) 214. Mobile Node 210 can be any device that changes its point of attachment from one network or subnetwork to another. Some examples of Mobile Nodes are cell phones or other wireless handheld devices such as a PDA. Access Gateway 212 communicates with Mobile Node 210 and provides a Care-of Address (CoA) for the forwarding of data. Depending on the embodiment, Access Gateway 212 can be implemented as a piece of hardware, a piece of software running on a microprocessor, or as commands on a piece of network equipment such as a router. Access Gateway 212 also communications with Home Agent 214 to forward requests from Mobile Node 210 and to receive data that is forwarded by Mobile Node 210. Home Agent (HA) 214 can have a Home Address (HoA) associated with it so that other devices in the network and devices in an internet can send data to the Home Address.

During operation of communication network 200, Mobile Node 210 can roam outside of its home network and from Home Agent 214. In certain embodiments of the present invention, Mobile Node 210 communicates through Access Gateway 212 to receive data from Home Agent 214. To initiate contact, in step 216, Mobile Node 210 sends a Layer 2/Dynamic Host Configuration Protocol (DHCP) Address Request which is received by Access Gateway 212. In step 218, Access Gateway 212 sends a Mobile IP (MIP) registration request (RRQ) including an IP address for the CoA and the HoA set equal to 0. By setting the HoA to 0, Home Agent 214 knows it needs to send the HoA corresponding to Mobile Node 210 to Access Gateway 212. Home Agent 214, upon receiving a registration request from Access Gateway 212 on behalf of Mobile Node 210, sends a MIP registration response in step 220. The registration response of step 220 includes the CoA of Access Gateway 212 and the HoA of Home Agent 214. In some embodiments, the registration response also includes an IP address which is used to identify Mobile Node 210 and which is associated with Mobile Node 210 throughout a session. Thus, Mobile Node 210 can keep the same IP address during handoffs, but can also obtain a new IP address when a new session is started. The HoA is sent to Mobile Node 210 in an address response of Layer 2/DHCP in step 222. In some embodiments, an IP address other than the HoA can be assigned and sent to Mobile Node 210.

An optional step 224 of bootstrapping Home Agent 214 is provided in certain embodiments of the invention. Bootstrapping typically involves the creation of a security association between a Mobile Node and a Home Agent when the Home Agent is previously unknown to the Mobile Node. The bootstrapping can be modified to create a security association between Access Gateway 212 and Home Agent 214 in place of Mobile Node 210 in certain embodiments of the invention. Access Gateway 212 can also store any security keys that might typically be sent to Mobile Node 210 for bootstrapping. Depending on the embodiment, the bootstrapping can be based on an existing home network security association, a network access security association, or a modification of an existing security association in MIP.

Another optional step 226 involves distributing neighborhood information from Home Agent 214 to Access Gateway 212. Neighborhood information may consist of data collected on next hop and 2-hop neighbors which can include addresses of neighbors, the willingness of a neighbor to carry data, and the status of a neighbor. In certain embodiments, neighborhood information can be received from the Authentication, Authorization, and Accounting server (AAA) or stored locally in the Access Gateway.

AAA server 136, the KDC 138, or the EAP server 140 of FIG. 1 may also send security information to Access Gateway 212 as is shown in step 228. The security information may include keys or other randomly generated numbers that are used to encrypt data or prevent attacks on the network.

Figure 3:
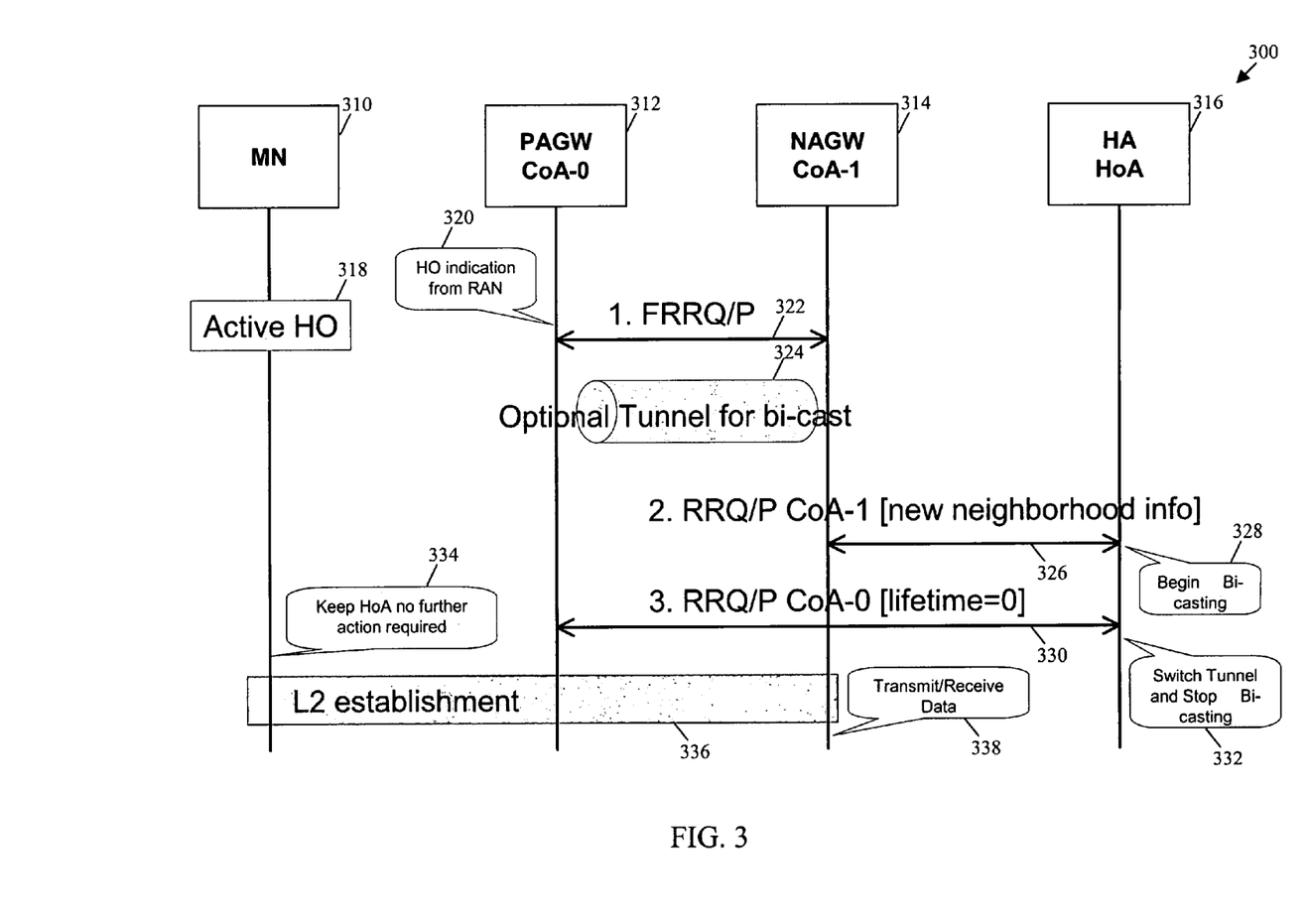
FIG. 3 illustrates a communication network handoff with MIP version 4 in accordance with certain embodiments of the invention.

FIG. 3 is graphical representation of communication network handoff 300 with MIP version 4 in accordance with certain embodiments of the present invention. Some of the devices involved in the handoff are represented in communication network handoff 300 and are Mobile Node 310, Previous Access Gateway (PAGW) 312, New Access Gateway (NAGW) 314, and Home Agent 316. In order to facilitate handoffs, Previous Access Gateway 312 and New Access Gateway 314 have different Care-of Address identifiers illustrated here as CoA-0 and CoA-1 that Home Agent 316 can use to forward data.

In certain embodiments, an Active Handoff 318 occurs when a Handoff indication 320 is sent from Radio Access Network 120 (FIG. 1) to PAGW 312 and NAGW 314. Active Handoff 318 can be predictive in nature with a Base Station sensing a Mobile Node is approaching. An example of this, referring to FIG. 1, is when Mobile Node 110 is moving from BS 114 towards BS 116. BS 116 can determine radio signals are increasing in strength from Mobile Node 110, while BS 114 can determine radio signals are decreasing in strength. In some embodiments, this can prompt Handoff indication 320 from RAN-1 120 to PAGW 124 and from RAN-2 122 to NAGW 126. In other embodiments, Handoff indication 320 can come from RAN-1 120 to PAGW 124, which then sends a registration request 144 to NAGW 126. PAGW 124 can use a Layer 2 triggered interface (L2 trigger) to dynamically create a peer-to-peer interface with NAGW 126 to initiate an inter-AGW handoff. A L2 trigger combines broadcast interface addressing with support for peer-to-peer interface associations within an otherwise broadcast interface.

The inter-AGW registration process is also shown in FIG. 3, at step 322, where PAGW 312 sends a registration request to NAGW 314, and NAGW 314 responds with a registration reply. Once PAGW 312 and NAGW 314 have finished registration and an association has formed, a tunnel can be setup for bi-casting information from both PAGW 312 and NAGW 314 to Mobile Node 110 at step 324. Referring to FIG. 1, a tunnel providing a bi-cast transmission would allow BS 114 and BS 116 to transmit the same information to Mobile Node 110 to protect against data loss and/or latency due to data loss in a handoff. The tunnel can also be used to synchronize the transmission to avoid jitter. Even if a tunnel is not setup for bi-casting in step 324, in some embodiments, step 322 can be followed by step 326 where a registration request is made by NAGW 314 to Home Agent 316 with a new Care-of Address, namely CoA-1. Also in step 326 Home Agent 316 sends a registration reply as well as neighborhood information.

In certain embodiments, the neighborhood information can be sent to NAGW 314 by an AAA, such as AAA 136 (FIG. 1), or the neighborhood information can be stored locally in the Access Gateways. When the neighborhood information is stored locally, a protocol or other suitable mechanism can be used to refresh the neighborhood information among the Access Gateways. After NAGW 314 has registered with Home Agent 316, bi-casting can begin in step 328. The bi-casting can occur through the tunnel or from Home Agent 316 to PAGW 312 and NAGW 314 in step 328. In step 330, PAGW 312 deregisters with Home Agent 316. The deregistration can be effected by sending a registration message with a lifetime set equal to zero. The deregistration can cause the tunnel to be torn down and the bi-casting to cease in step 332. Alternatively, Home Agent 316 can cease bi-casting to PAGW 312 if no tunnel is used. After step 330, a Layer 2 connection can be established between NAGW 314 and Mobile Node 310 in step 334. The Layer 2 connection of step 334 can keep the IP address of Mobile Node 310 used before the handoff to maintain continuity of a session. This IP address can be passed from Home Agent 316 to NAGW 314 in step 326.

Figure 4:
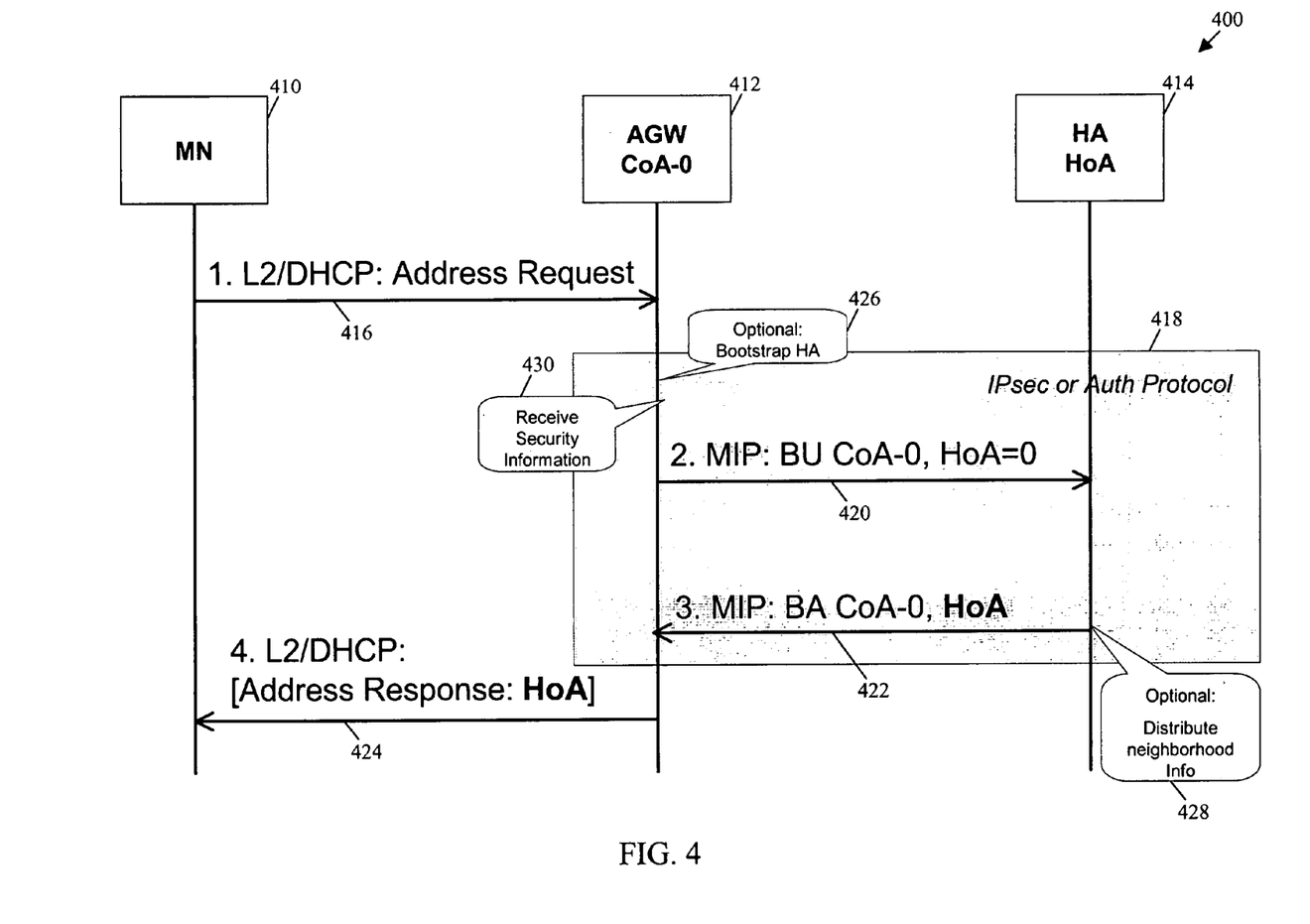
FIG. 4 is a signaling diagram that illustrates how a mobile node accesses a network with IP version 6 in accordance with certain embodiments of the invention.

FIG. 4 is a graphical representation of a signaling diagram 400 which illustrates how a mobile node accesses a network with Mobile IP version 6 in accordance with certain embodiments of the present invention. As shown, signaling diagram 400 includes system components of a Mobile Node 410, an Access Gateway 412, and a Home Agent 414. When Mobile Node 410 attempts to access the network in step 416, Mobile Node 410 sends a L2/DHCP address request to AGW 412. AGW 412 contacts Home Agent 414 with IP Security (IPsec) and/or Authentication Protocol (Auth Protocol) 418. IPsec and Auth Protocol are security protocols that allow some form of encryption to be placed on portions of the data transmitted between AGW 412 and HA 414. In step 420, a Binding Update (BU) is sent from AGW 412 to Home Agent 414 with a Care-of Address (CoA-0) from AGW 412 and a request for a Home Address (HoA). This request can be implemented by setting HoA=0 in the BU. Home Agent 414 acknowledges the BU sent by AGW 412 by sending a Binding Acknowledgement (BA) to the CoA-0 including the Home Address. AGW 412 sends the Home Address to Mobile Node 410 in a L2/DHCP address response and Mobile Node 410 can store the Home Address in its stack, e.g., an IP Stack. Home Agent 414 can dynamically assign the Home Address sent to an AGW in a BA. The Home Address assignment can be provided by an algorithm, a lookup table, or any other suitable technique. Upon receiving an address response, Mobile Node 410 can access the network to send and receive data. Optionally, in step 426, AGW 412 can bootstrap Home Agent 414 as described in FIG. 2 and neighborhood information can be distributed by Home Agent 414 in step 428.

The AAA server, the KDC, or the EAP server may also send security information to Access Gateway 412 as is shown in step 430. The security information may include keys or other randomly generated numbers that are used to encrypt data or prevent attacks on the network.

Figure 5:
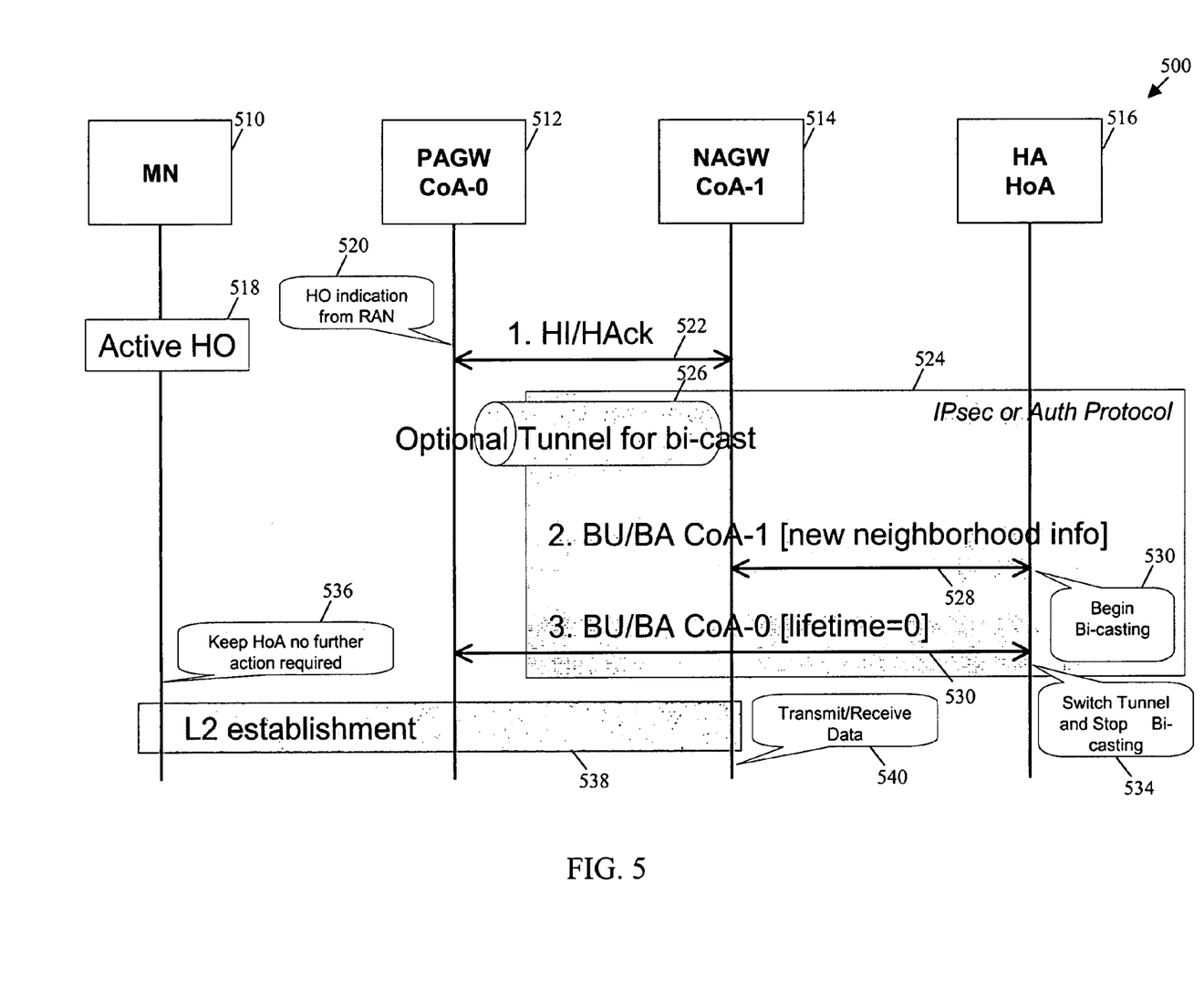
FIG. 5 is a signaling diagram that illustrates how a handoff occurs in a MIP 6 network in accordance with certain embodiments of the invention.

FIG. 5 is a graphical representation of a signaling diagram 500 that illustrates how a handoff occurs in a MIPv6 network in accordance with certain embodiments of the present invention. Signaling diagram 400 includes system components of a Mobile Node 510, a PAGW 512, a NAGW 514, and a Home Agent 516. In an active handoff 518, Mobile Node 510 can already have a Home Address in its stack from previously registering with network system 500, for example, as shown in FIG. 4. An advantage of some embodiments is that Mobile Node 510 can maintain a DHCP session and keep the same IP address through a handoff.

A handoff indication occurs from the Radio Access Network, such as RAN-1 120, in step 520. The handoff indication can be due to any suitable mechanism such as relative signal strength between neighboring RANs. PAGW 512, in step 522, sends a Handover Initiate (HI) and NAGW 514 send a Handover Acknowledgement (HAck). PAGW 512 can also distribute to NAGW 514 any security keys associated with Mobile Node 510. In some embodiments, NAGW 514 is trusted by PAGW 512 so security information can be communicated. This domain of trust can be obtained by pre-clearing NAGW 514. In step 524, an IPsec or Auth protocol can be used by NAGW 514 to secure communications between PAGW 512 and Home Agent 516. An optional tunnel can be setup for bi-casting data in step 526 as described above for a MIPv4 embodiment. In some embodiments, data passed to NAGW 514 from PAGW 512 is buffered on NAGW 514 until a L2 link is established between NAGW 514 and Mobile Node 510. The buffering of data can prevent data loss that may occur during a handoff.

Part of the handoff process involves sending Home Agent 516 a Care-of Address, CoA-1, that is associated with NAGW 514. NAGW 514 sends the CoA-1 in a Binding Update and receives neighborhood information from Home Agent 516 in a Binding Acknowledgement in step 528. In step 530, bi-casting through the optional tunnel or from Home Agent 516 can begin. PAGW 512, in step 532, sends a Binding Update with a lifetime=0 to terminate its communication with Home Agent 516 and bi-casting can be stopped in step 534. Mobile Node 510 can then establish an L2 link keeping its Home Address after the Handoff in steps 536 and 538. Typically, with the establishment of a new L2 link a new Home Address is obtained by the Mobile Node. However, by allowing Mobile Node 510 to keep the same Home Address, data loss and any latency issues caused by obtaining a new Home Address can be reduced and/or avoided. In step 540, data transmission can begin from NAGW 514 to Mobile Node 510. In some embodiments, buffered data from the bi-casting can be used to prevent data loss in the handoff.

Figure 6:
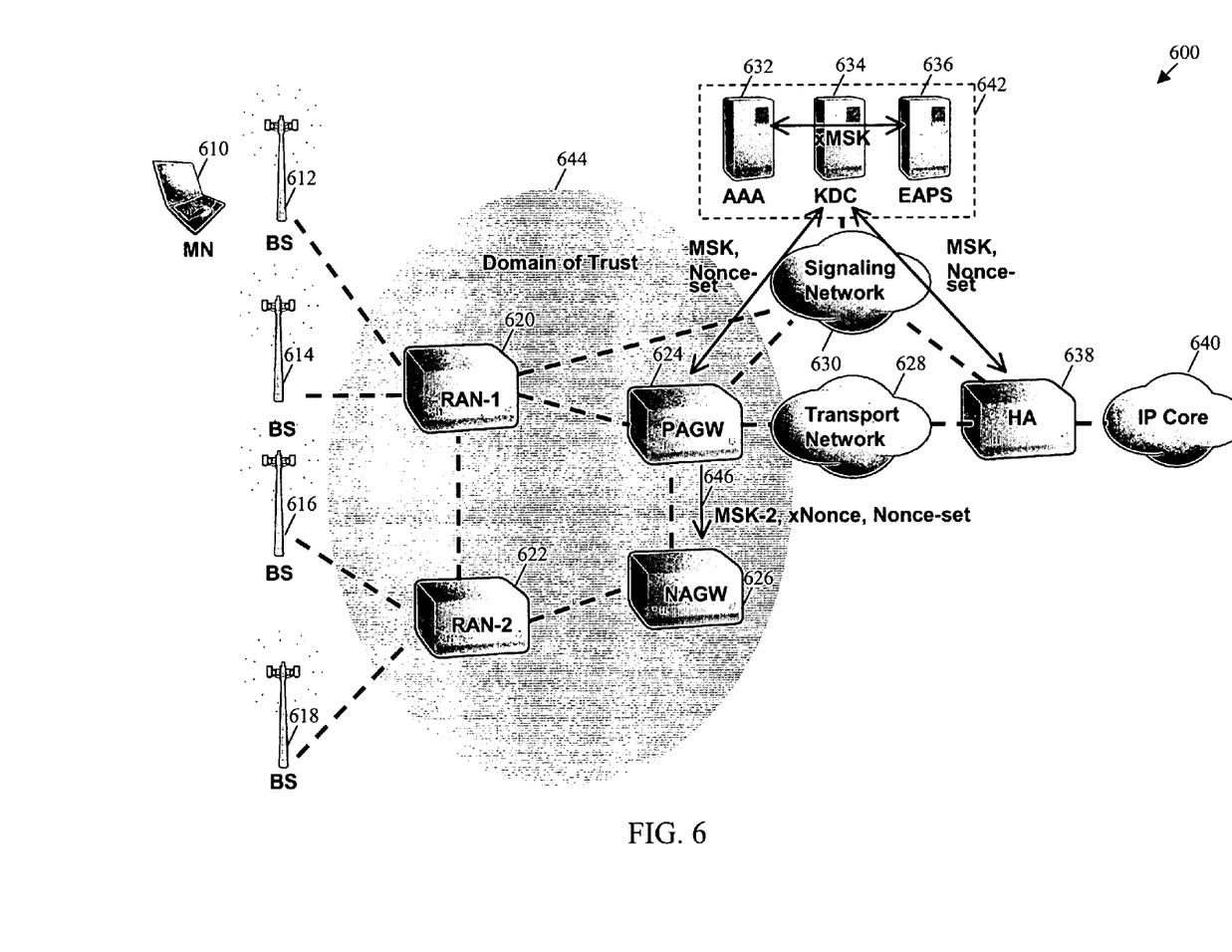
FIG. 6 illustrates how security mechanisms are distributed in wireless network in accordance with certain embodiments of the invention.

FIG. 6 illustrates how security mechanisms are distributed in wireless network 600 in accordance with certain embodiments of the present invention. Wireless network 600 includes Mobile Node 610, Base Station (BS) 612-618, Radio Access Network (RAN) equipment 620-622, Previous Access Gateway (PAGW) 624, New Access Gateway (NAGW) 626, Transport Network 628, Signaling Network 630, Authentication, Authorization, and Accounting (AAA) Server 632, Key Distribution Center (KDC) 634, and Extensible Authentication Protocol (EAP) Server 636, Home Agent (HA) 638, IP Core 640. As may be appreciated by one skilled in the art, routers, servers and other pieces of networking and communication equipment may also be included in wireless data network 600 depending on the embodiment. In some embodiments, EAP Server 636 may be combined with AAA Server 632 and in other embodiments AAA Server 632, KDC 634, and EAP Server may be implemented on a security server 642.

The security associations involved with AAA Server 632, KDC 634, and EAP Server may be a set of policies and cryptographic states used to protect data and may include cryptographic keys, negotiated parameters, counters, sequence spaces, authorization attributes, and/or any other suitable security mechanism. The security associations can be used to setup a domain of trust 644. The domain of trust allows one device to trust another to communicate security information.

In wireless network 600, a Master Session Key (MSK) is a security component used to protect data. The MSK can be keying material that is derived between EAP Server 636 and a peer, such as PAGW 624. In some embodiments, the MSK can be generated by AAA Server 632 or KDC 634 and an Access Gateway in a L2 link with Mobile Node 610. As shown, an xMSK is shared among AAA Server 632, KDC 634, and EAP Server 636 which may be an Extended MSK that incorporates additional keying material over the MSK and is never shared with a third party or may be another MSK for use within the security servers 642. A Transient Session Key (TSK) may be a session key used to protect data exchanged between PAGW 624 or an Access Gateway with a L2 link to Mobile Node 610 and Home Agent 638. The session keys are used after the EAP authentication has successfully completed and are appropriate for a lower layer of encryption as negotiated between the Access Gateway and Home Agent 638. Further, a Nonce-set or Nonce can be a random number that binds a request and a reply to avoid attacks on wireless network 600.

During network access, the output of EAP Server 636 can be a MSK, as is shown for example in step 224. The MSK is distributed to AGW 212 of FIG. 2 or PAGW 624 of FIG. 6 (EAP authenticator) on the first L2/DHCP request by Mobile Node 610. KDC 634 may also generate and distribute a key Nonce-set (such as nonce-1, nonce-2, and nonce-3) to PAGW 624 and Home Agent 638. PAGW 624 along with Home Agent 638 can derive and negotiate one or more TSKs from the MSK and key Nonce-set. The TSK between Mobile Node 610 and Home Agent 638 can be a pseudo-random function (prf) of the Foreign Agent Address, Home Agent Address, an User ID, an ID-field, nonce-1, and MSK. (where the Foreign Agent can be PAGW 624 or a PDSN; the User ID can be any generic identifier such as a Medium Access Control identifier, a network access identifier, or any other suitable identification; the ID-field can be a one octet number that is contained in an EAP data packet for use in matching responses with requests). Optionally, a TSK can be generated for interactions between Mobile Node 610 and AAA 632 by using a prf of a Network Access Server (NAS) IP address, User ID, ID-field, nonce-2, and MSK (where a NAS can be AAA Server 632 or any other server used in granting access and security information). Also an optional TSK can be generated for Foreign Agent to Home Agent interactions by using a prf of the following: Foreign Agent Address, Home Agent Address, ID-field, nonce-3, and MSK.

In some embodiments, upon handoff detection PAGW 624 computes a new MSK (MSK-2). Alternatively, MSK-2 can be generated as soon as PAGW 624 determines the neighborhood information which may at a minimum include Foreign Agent addresses of neighboring Access Gateways. The MSK-2 can be generated by taking a prf of NAGW Foreign Agent address, an xNonce, and MSK (where an xNonce can be a nonce used in handoff situations). During the handoff procedure, PAGW 624 distributes the MSK-2, the xNonce, and the Nonce-set to NAGW 626 as shown by arrow 646.

As before with PAGW 624, NAGW 626 along with Home Agent 638 can derive and negotiate one or more TSKs from the MSK-2 and key Nonce-set. The TSK between Mobile Node 610 and Home Agent 638 can be a pseudo-random function (prf) of the Foreign Agent Address, Home Agent Address, an User ID, an ID-field, nonce-1, and MSK-2. Optionally, a TSK can be generated for interactions between Mobile Node 610 and AAA 632 by using a prf of a Network Access Server (NAS) IP address, User ID, ID-field, nonce-2, and MSK-2. Also an optional TSK can be generated for Foreign Agent to Home Agent interactions by using a prf of Foreign Agent Address, Home Agent Address, ID-field, nonce-3, and MSK-2. In some embodiments, xNonce is included in communication with Home Agent 638.

In certain embodiments, upon receiving a registration request or a binding update from the Access Gateway, such as NAGW 626, Home Agent 638 can compute a derived MSK-2 by using a prf of the source IP address of the received packet, the xNonce, and the MSK. Home Agent 638 can authenticate the registration request or the binding update as normal with the derived MSK-2. If authentication succeeds, Home Agent 638 responds back to the source IP address of the received packet. In some embodiments, the response is a registration reply or a binding acknowledgement. The security associations can prevent a fake NAGW (that spoofed a valid FA) from gaining access address because the fake NAGW does not receive the BA/RRP response.

Figure 7:
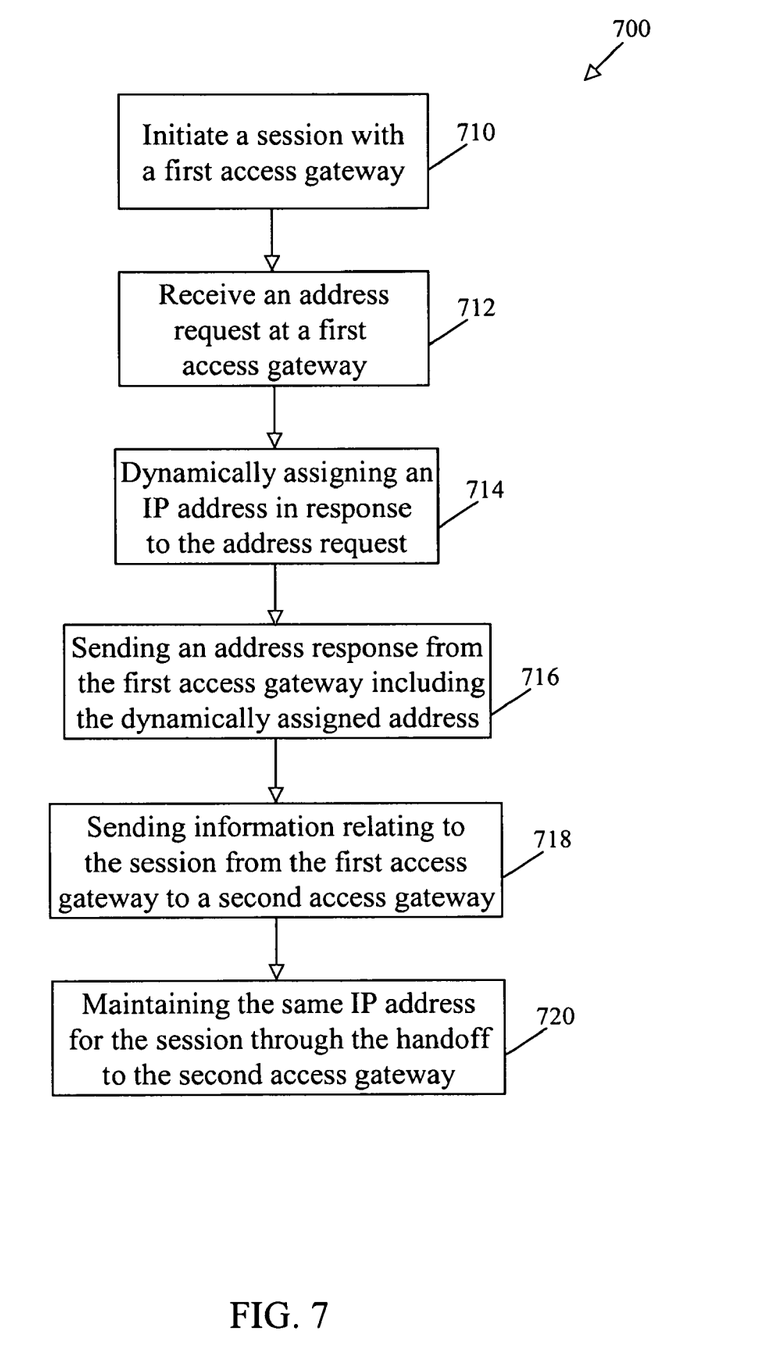
FIG. 7 illustrates a flow diagram of mobility management in accordance with certain embodiment of the invention.

FIG. 7 illustrates a flow diagram 700 in accordance with certain embodiments of the invention. In step 710, a mobile node begins initiating a session with a first access gateway. This can include setting up a point-to-point (PPP) link establishing Layer 2 communication. In step 712, the first access gateway receives an address request from the mobile node. An IP address is dynamically assigned in response to the address request in step 714. The dynamic assignment can be performed by a home agent. The first access gateway sends the mobile node the dynamically assigned IP address in step 716. In step 718, information relating to the session between the mobile node and the first access gateway is sent from the first access gateway to the second access gateway. This can also include setting up a bi-directional tunnel between the first and second access gateways so session data can be bi-cast to the mobile node. The second access gateway maintains the same IP address with the mobile node when the mobile node moves from the first access gateway to the second access gateway in step 720.

In some embodiments, software needed for implementing a process includes a high level procedural or an object-orientated language such as C, C++, C#, Java, or Perl. The software may also be implemented in assembly language if desired. The links or mapping may be implemented by pointers, memory references, or any other applicable method. The database or virtual database may be created by a number of different data structures such as arrays, linked-lists, trees, associative arrays, stacks, and queues. In certain embodiments, the software is stored on a storage medium or device such as read-only memory (ROM), programmable-read-only memory (PROM), or magnetic disk that is readable by a general or special purpose-processing unit to perform the processes described in this document. In some embodiments, an access gateway, a packet data serving node (PDSN), a foreign agent (FA), or home agent (HA) can be implemented on a Starent Networks, Corp. of Tewksbury, Mass. ST-16 Intelligent Mobile Gateway. Other types of devices can also be used in other embodiments to setup tunnels such as a Gateway General packet radio service Service Node (GGSN), a serving GPRS support node (SGSN), a session initiation protocol (SIP) server, a proxy-call session control function (P-CSCF), and an interrogating-call session control function (I-CSCF).

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A communication system with mobility management for communicating with mobile nodes comprising:
a first access gateway configured to obtain security information from at least one server and to send an address response with a dynamically assigned IP address to a mobile node in response to receiving an address request from the mobile node and to pre-clear itself with at least one server so that the first access gateway is included in a domain of trust;
the first access gateway sending to a second access gateway information including security information regarding the mobile node, when the mobile node is being handed off from the first access gateway to the second access gateway, wherein the information allows the second access gateway to maintain the same dynamically assigned IP address for the mobile node, wherein the first access gateway establishes that the second access gateway is in the domain of trust after the second access gateway undergoes a pre-clearance so both the first access gateway and the second access gateway are in the domain of trust allowing the first access gateway to communicate security information in a secure fashion to the second access gateway during a handoff of the mobile node.

2. The system of claim 1, further comprising a home agent that assigns a home address dynamically to mobile nodes.

3. The system of claim 2, wherein the home agent communicates with the first access gateway using Mobile Internet Protocol (MIP) version 6.

4. The system of claim 2, wherein the first access gateway contacts the home agent with at least one of IP Security protocol (IPsec) and Authentication Protocol.

5. The system of claim 1, further comprising a bi-casting tunnel setup between the first access gateway and the second access gateway where data received at the first access gateway is sent through the bi-casting tunnel to the second access gateway, allowing both the first access gateway and second access gateway to transmit the same information to the mobile node.

6. The system of claim 1, wherein the first access gateway uses a layer 2 triggered interface (L2 trigger) to dynamically create a peer-to-peer interface with the second access gateway to initiate an inter-access gateway handoff.

7. The system of claim 1, wherein the security information sent from the first access gateway to the second access gateway includes at least one of a master session key (MSK), an xNonce, and a Nonce-set.

8. The system of claim 1, wherein sending information from the first access gateway to the second access gateway allows the mobile node to maintain a DHCP session including the same IP address through the handoff.

9. The system of claim 1, further comprising, in combination, the second gateway configured to receive from the first access gateway information regarding the mobile node when the mobile node is handed off from the first access gateway to the second access gateway, the second access gateway communicating with the mobile node using the same dynamically assigned IP address that was being used by the first access gateway when communicating with the mobile node.

10. The system of claim 9, further comprising the second access gateway providing mobility management functions of a mobile node stack at the second access gateway including address management for the mobile node being handed off.

11. The system of claim 9, wherein the pre-clearance process includes exchanging security associations including a set of policies between the first access gateway and the server to place the first access gateway in the domain of trust.

12. The system of claim 1, wherein the domain of trust between the second access gateway and the first access gateway allows passing of security information without having the mobile node re-associate and re-authorize to obtain the security information.

13. A method of mobility management at a first access gateway that is in communication with a second access gateway in a communication network, the method comprising:
receiving from a requesting mobile node an address request at a first access gateway;
sending to the requesting mobile node an address response from the first access gateway including a dynamically assigned IP address;
obtaining security information from at least one server to provide security between the first access gateway and the mobile node;
pre-clearing the first access gateway with at least one server so that the first access gateway is included in a domain of trust;
sending information from the first access gateway to a second access gateway regarding a mobile node that is being handed off from the first access gateway to the second access gateway, wherein the information allows the second access gateway to maintain the same IP address for the mobile node through the handoff; and
establishing that the second access gateway is in the domain of trust by checking the second access gateway underwent a pre-clearance so both the first access gateway and the second access gateway are in the domain of trust, wherein the domain of trust allows the first access gateway to communicate the security information to the second access gateway during a handoff of the mobile node.

14. The method of claim 13, further comprising sending communications from a home agent to the first access gateway using Mobile Internet Protocol (MIP) version 6.

15. The method of claim 13, further comprising sending communications from the first access gateway to the home agent using at least one of IP Security protocol (IPsec) and Authentication Protocol.

16. The method of claim 13, further comprising setting up a bi-casting tunnel between the first access gateway and the second access gateway where data received at the first access gateway is sent through the bi-casting tunnel to the second access gateway, allowing both the first access gateway and second access gateway to transmit the same information to the mobile node.

17. The method of claim 13, further comprising creating a peer-to-peer interface between the first access gateway and the second access gateway using a layer 2 triggered interface (L2 trigger) to initiate an inter-access gateway handoff.

18. The method of claim 13, wherein the communication of security information from the first access gateway to the second access gateway includes at least one of a master session key (MSK), an xNonce, and a Nonce-set.

19. The method of claim 13, wherein sending information from the first access gateway to the second access gateway allows the mobile node to maintain a DHCP session through the handoff.

20. The method of claim 13, further comprising maintaining the same IP address through the handoff by anchoring layer 3 mobility at the second access gateway.

21. The method of claim 13, further comprising pre-clearing the second access gateway so the second access gateway is trusted by the first access gateway.

22. A communication system with mobility management comprising:
a first means for managing mobility that receives an address request from a mobile node, sends an address response with a dynamically assigned IP address to the mobile node, and obtains security information from at least one server to provide security between the first means and a mobile means for wireless communication and to pre-clear the first means with at least one server so that the first means is included in a domain of trust;
the first means sending to a second means for managing mobility information including security information regarding the mobile means, when the mobile node is being handed off from the first means to the second means, wherein the information sent to the second means allows the second means to maintain the same dynamically assigned IP address for the mobile node, wherein the first means trusts the second means by establishing the second means underwent a pre-clearance so both the first means and the second means are in the domain of trust allowing the first means to communicate security information to the second means during a handoff of the mobile means.

23. The system of claim 22, wherein the first means uses a layer 2 triggered interface (L2 trigger) to dynamically create a peer-to-peer interface with the second means to initiate a handoff.

* * * * *